United States Patent
Tomic et al.

(10) Patent No.: US 10,254,981 B2
(45) Date of Patent: Apr. 9, 2019

(54) ADAPTIVE HEALTH GRADING FOR A NON-VOLATILE MEMORY

(71) Applicant: INTERNATIONAL BUSINESS MACHINES CORPORATION, Armonk, NY (US)

(72) Inventors: Sasa Tomic, Kilchberg (CH); Roman A. Pletka, Uster (CH)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 15/376,291

(22) Filed: Dec. 12, 2016

(65) Prior Publication Data
US 2018/0165021 A1    Jun. 14, 2018

(51) Int. Cl.
*G06F 12/00* (2006.01)
*G06F 3/06* (2006.01)
*G06F 12/02* (2006.01)
*G06F 11/10* (2006.01)

(52) U.S. Cl.
CPC ............ *G06F 3/0619* (2013.01); *G06F 3/061* (2013.01); *G06F 3/064* (2013.01); *G06F 3/0616* (2013.01); *G06F 3/0655* (2013.01); *G06F 3/0688* (2013.01); *G06F 11/10* (2013.01); *G06F 12/0246* (2013.01)

(58) Field of Classification Search
CPC ...... G06F 3/0619; G06F 3/061; G06F 3/0688; G06F 3/0655; G06F 12/0246
See application file for complete search history.

(56) References Cited

U.S. PATENT DOCUMENTS 8,751,726 B2    6/2014   Katz
9,857,986 B2 *  1/2018   Fisher ................... G06F 3/061
(Continued)

OTHER PUBLICATIONS

Murugan et al., "Rejuvenator: A Static Wear Leveling Algorithm for NAND Flash Memory with Minimized Overhead," 2011 IEEE 27th Symp on Mass Storage Systems and Technologies (MSST), IEEE, 2011.

(Continued)

*Primary Examiner* — Tuan V Thai
*Assistant Examiner* — Tasnima Matin
(74) *Attorney, Agent, or Firm* — Brian F. Russell; Robert Sullivan

(57) ABSTRACT

A data storage system includes a controller that controls a non-volatile memory array including a plurality of blocks. The controller assigns blocks to a plurality of different health grades. The controller maintains a plurality of ready-to-use queues identifying blocks that do not currently hold valid data and are ready for use for data storage. Each of the ready-to-use queues is associated with a respective one of the health grades. The controller monitors fill levels in the ready-to-use queues, and based on the monitoring, adjusts at least one health grade block distribution for the plurality of blocks. Based on the adjustment of the at least one health grade block distribution, the controller thereafter re-grades blocks and assigns blocks to the plurality of ready-to-use queues in accordance with the at least one health grade block distribution that was adjusted, such that distribution of blocks within the plurality of ready-to-use queues is improved.

21 Claims, 9 Drawing Sheets

(56) References Cited

U.S. PATENT DOCUMENTS

| | | | |
|---|---|---|---|
| 2006/0106972 A1* | 5/2006 | Gorobets | G06F 12/0246 711/103 |
| 2007/0294490 A1* | 12/2007 | Freitas | G06F 12/0246 711/154 |
| 2008/0279005 A1* | 11/2008 | France | G06F 12/0246 365/185.11 |
| 2010/0174845 A1* | 7/2010 | Gorobets | G06F 12/0246 711/103 |
| 2011/0010489 A1* | 1/2011 | Yeh | G06F 12/0246 711/103 |
| 2011/0191521 A1* | 8/2011 | Araki | G06F 12/0246 711/103 |
| 2012/0317345 A1* | 12/2012 | Pan | G06F 12/0246 711/103 |
| 2014/0101379 A1* | 4/2014 | Tomlin | G06F 3/0608 711/103 |
| 2015/0058530 A1* | 2/2015 | Reddy | G06F 3/0616 711/103 |
| 2015/0067245 A1 | 3/2015 | Kruger | |
| 2015/0178191 A1* | 6/2015 | Camp | G06F 12/0246 711/103 |
| 2016/0004458 A1* | 1/2016 | Micheloni | G06F 12/00 711/103 |
| 2016/0170682 A1* | 6/2016 | Bakshi | G06F 3/0649 711/103 |

OTHER PUBLICATIONS

Harrison et al., "Storage Workload Modelling by Hidden Markov Models: Application to FLASH Memory," Performance Evaluation, 69.1 (2012): 17-40, arXiv.org, Sep. 14, 2012.

* cited by examiner

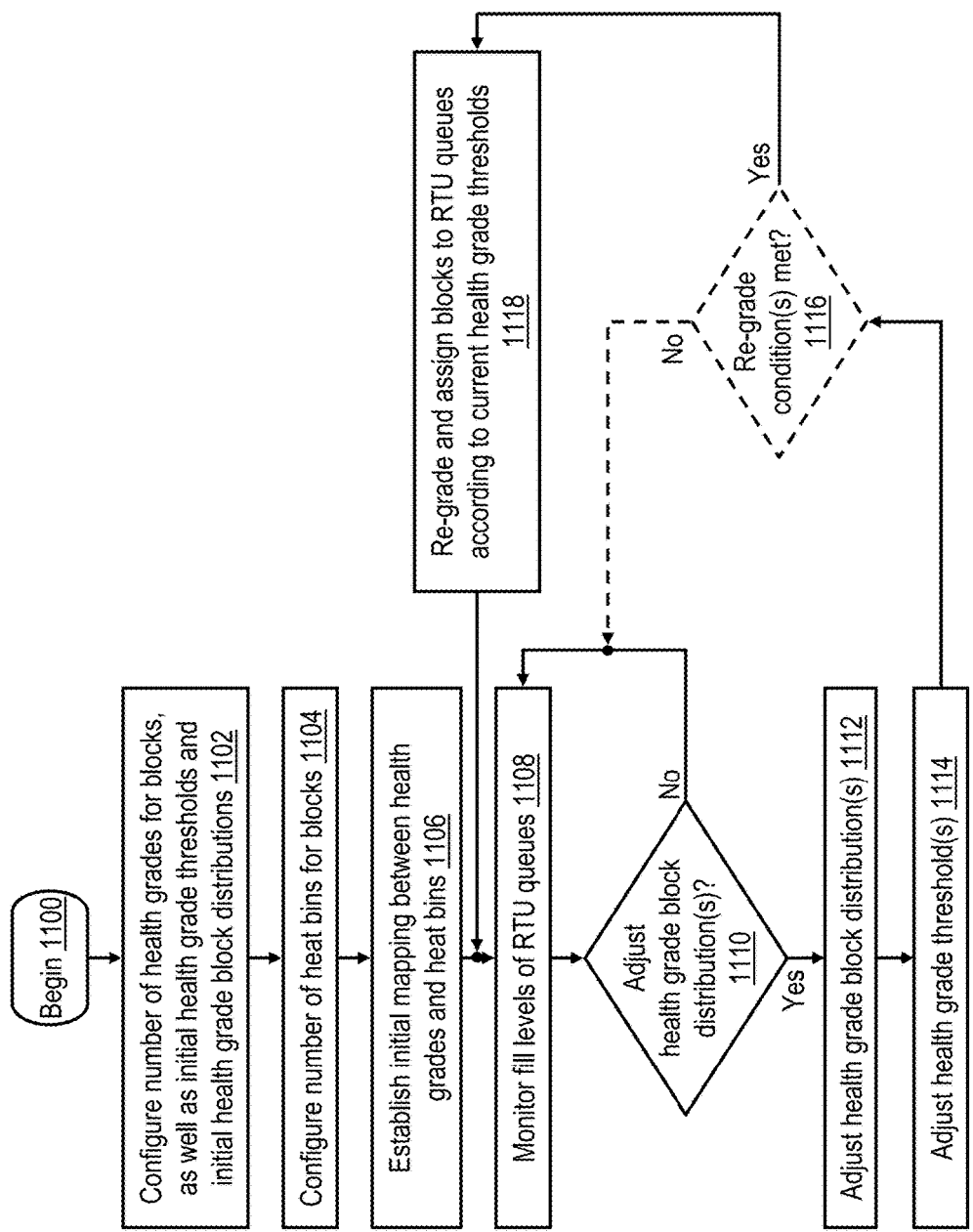

ADAPTIVE HEALTH GRADING FOR A NON-VOLATILE MEMORY

BACKGROUND OF THE INVENTION

This disclosure relates to data processing and storage, and more particularly, to management of a non-volatile memory system, such as a flash memory system. Still more particularly, the disclosure relates to improving health management of a non-volatile memory system through adaptive health grading.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As cell densities and the number of bits stored per cell in flash memory continue to increase in subsequent generations of flash technology, the data stored in the memory cells to become more vulnerable to bit errors induced by read disturbs, high ambient temperatures, long storage durations and other factors. Consequently, the number of read/write cycles for which flash memories are rated have generally been declining even while storage density and storage cost per unit of data have been improving.

To obtain the longest useful life from a given flash memory various health management techniques have been proposed. For example, some flash memory systems implement read sweeping, which entails an ongoing or periodic background read of data stored within the flash memory to ensure that the data can be correctly read and decoded. A flash memory system may also implement wear leveling, which relocates data within the flash memory to equalize wear between blocks. Block calibration may also be implemented to optimize read threshold voltages, such that observed error counts on reads are reduced. In addition, health binning may be employed to classify blocks based on, for example, one or more health metrics, such as error counts.

BRIEF SUMMARY

Some existing health management techniques achieve satisfactory improvements in longevity under some operating conditions for some workloads. For example, some existing health management technique result in longevity improvements under workloads that are characterized by sequential write accesses or highly skewed write accesses, that is, that access a small fraction of extents within the data storage system with a large fraction of the workload's I/O accesses and that make few accesses to a large fraction of extents. However, under other operating conditions or other workloads, for example, under lightly skewed write workloads or in systems having less overprovisioning or in high write amplification scenarios, only marginal endurance enhancements are obtained by some conventional health management techniques.

It would therefore be desirable to implement a health management technique that provides endurance enhancements under those operating conditions and/or workloads in which it has conventionally been difficult to achieve improved endurance by health management (e.g., lightly skewed workloads or less overprovisioning or high write amplification) while still exhibiting good endurance for sequential and highly-skewed workloads.

In at least one embodiment, a data storage system includes a controller that controls a non-volatile memory array including a plurality of blocks. The controller assigns the plurality of blocks to a plurality of different health grades. The controller maintains a plurality of ready-to-use queues identifying blocks that do not currently hold valid data and are ready for use for data storage. Each of the plurality of ready-to-use queues is associated with a respective one of the plurality of health grades. The controller monitors fill levels in the plurality of ready-to-use queues, and based on the monitoring, adjusts at least one health grade block distribution for the plurality of blocks. Based on the adjustment of the at least one health grade block distribution, the controller thereafter re-grades blocks among the plurality of blocks and assigns blocks among the plurality of blocks to the plurality of ready-to-use queues in accordance with the at least one health grade block distribution that was adjusted, such that distribution of blocks within the plurality of ready-to-use queues is improved.

BRIEF DESCRIPTION OF THE SEVERAL VIEWS OF THE DRAWINGS

FIG. 11 is a high level logical flowchart of an exemplary process for adapting block health grades in accordance with one embodiment.

DETAILED DESCRIPTION

Figure 1A:
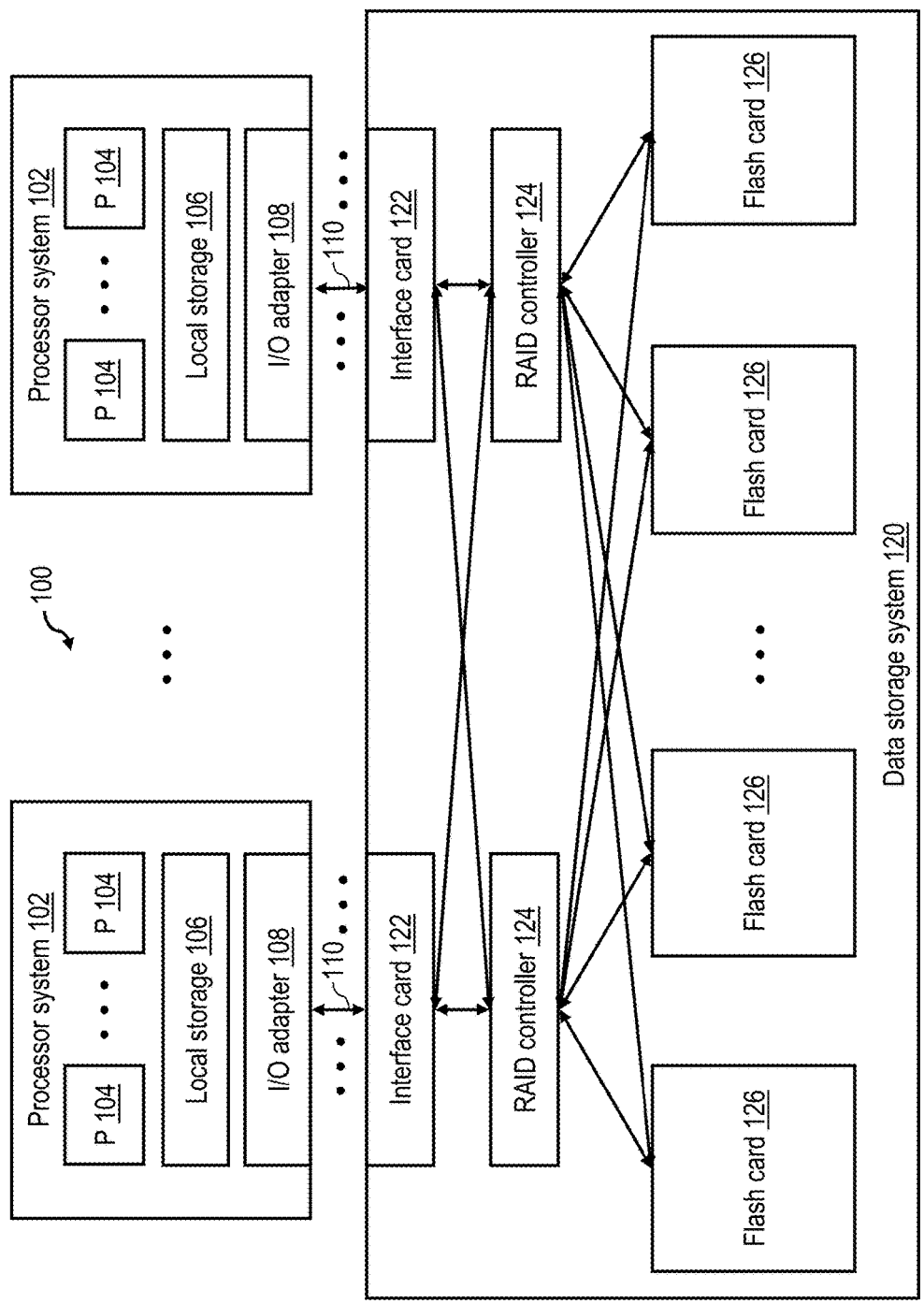
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. Processor system 102 may additionally include local storage 106 (e.g., dynamic random access memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER series available from International Business Machines Corporation), or a mainframe computer system. Processor system 102 can also be an embedded processor system using various processors such as ARM, Power, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), Infini-Band, Transport Control Protocol/Internet Protocol (TCP/IP), Peripheral Component Interconnect Express (PCIe), etc. I/O operations (IOs) communicated via I/O channel 110 include read IOs by which a processor system 102 requests data from data storage system 120 and write IOs by which a processor system 102 requests storage of data in data storage system 120.

In the illustrated embodiment, data storage system 120 includes multiple interface cards 122 through which data storage system 120 receives and responds to input/output operations (IO) 102 via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, other lossy storage media can be employed.

Figure 1B:
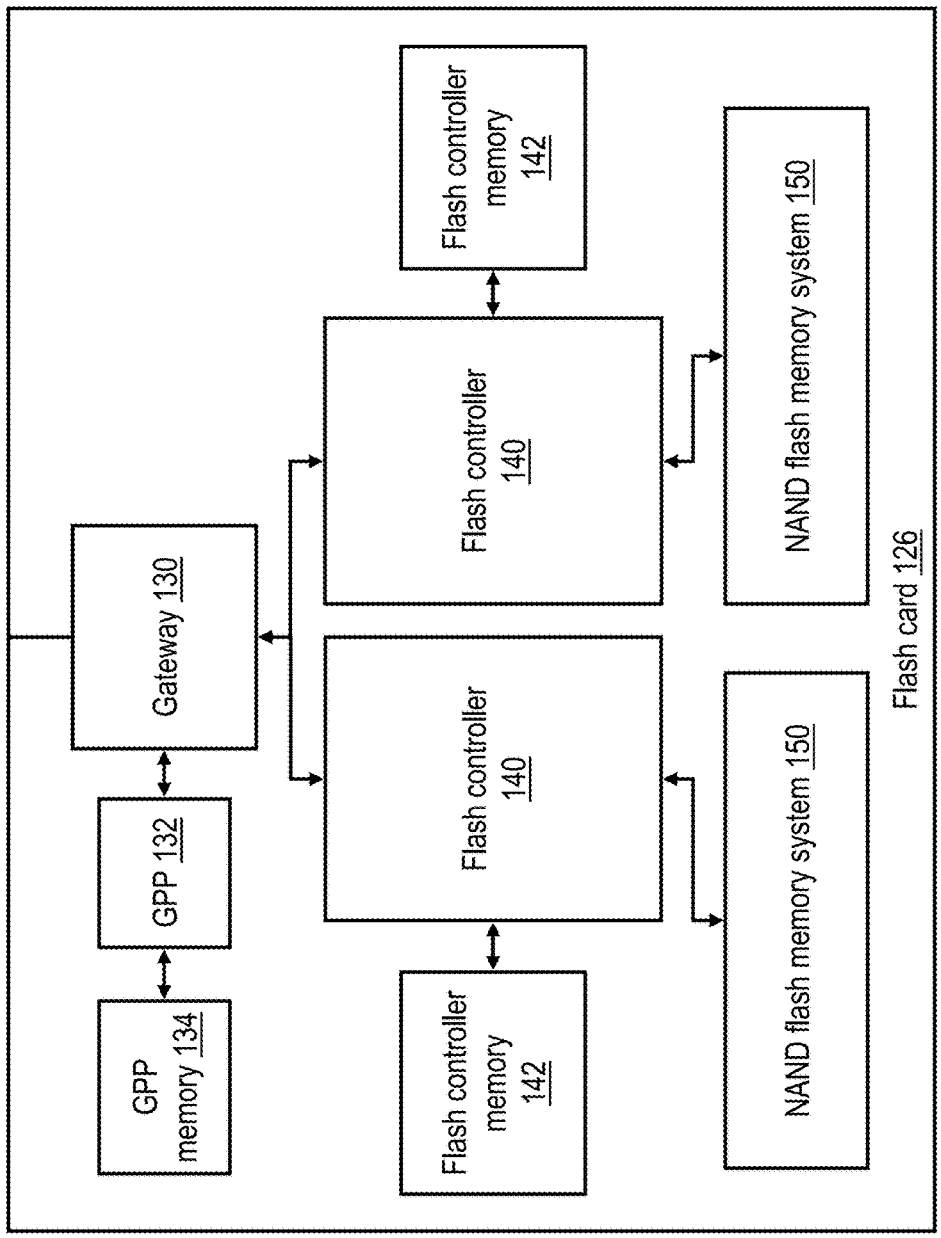
FIG. 1B is a more detailed block diagram of a flash card of the data storage system of FIG. 1A.

FIG. 1B depicts a more detailed block diagram of a flash card 126 of data storage system 120 of FIG. 1A. Flash card 126 includes a gateway 130 that serves as an interface between flash card 126 and RAID controllers 124. Gateway 130 is in turn coupled to an integrated circuit such as a general-purpose processor (GPP) 132, which can be configured (e.g., by program code) to perform various management functions, such as garbage collection, wear-leveling, health binning, pre-processing of IOs received by gateway 130 and/or scheduling servicing of the IOs by flash card 126. GPP 132 is coupled to a GPP memory 134 (e.g., Dynamic Random Access Memory (DRAM) or Magneto-resistive Random Access Memory (MRAM)) that can conveniently buffer data created, referenced and/or modified by GPP 132 in the course of its processing.

Gateway 130 is further coupled to multiple flash controllers 140, each of which controls a respective NAND flash memory system 150. Flash controllers 140 can be implemented, for example, by an Application Specific Integrated Circuit (ASIC) or Field Programmable Gate Array (FPGA)) having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOs from gateway 130 that request to read data stored in NAND flash memory system 150 and/or to store data in NAND flash memory system 150. Flash controllers 140 service these IOs, for example, by accessing NAND flash memory systems 150 to read or write the requested data from or into NAND flash memory systems 150 or by accessing one or more read and/or write caches (not illustrated in FIG. 1B) associated with NAND flash memory systems 150.

Flash controllers 140 implement a flash translation layer (FTL) that provides logical-to-physical address translation to enable access to specific memory locations within NAND flash memory systems 150. In general, an IO received by flash controller 140 from a host device, such as a processor system 102, contains the logical block address (LBA) at which the data is to be accessed (read or written) and, if a write IO, the write data to be written to data storage system 120. The IO may also specify the amount (or size) of the data to be accessed. Other information may also be communicated depending on the protocol and features supported by data storage system 120. As is known to those skilled in the art, NAND flash memory, such as that employed in NAND flash memory systems 150, is constrained by its construction such that the smallest granule of data that can be physically accessed by a read or write IO is fixed at the size of a single flash memory page, for example, 16 kilobytes (kB). The LBA provided by the host device corresponds to a logical page within a logical address space, the page typically having a size of 4 kilobytes. Therefore, more than one logical page may be stored in a physical flash page. The flash translation layer translates this LBA into a physical address assigned to a corresponding physical location in a NAND flash memory system 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. Referring now to FIGS. 2-5, there is depicted one exemplary arrangement of physical memory within a NAND flash memory system 150 in accordance with one exemplary embodiment.

Figure 2:
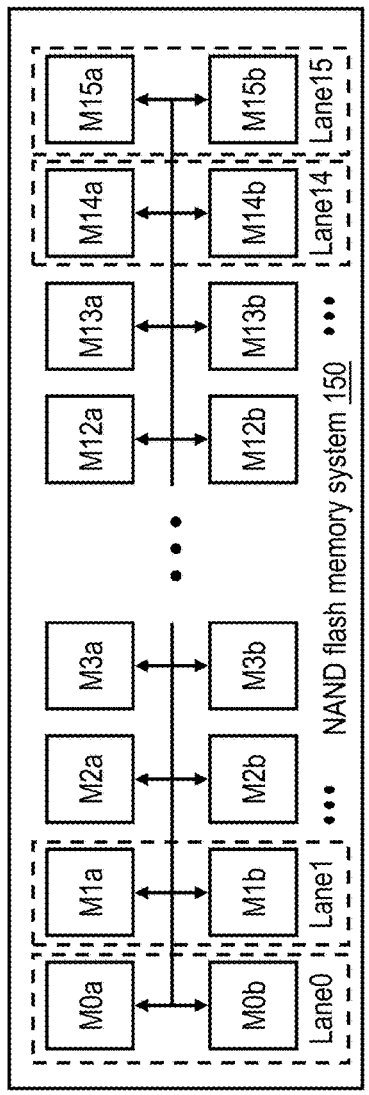
FIGS. 2-5 illustrate an exemplary arrangement of physical memory within a NAND flash memory system in accordance with the present disclosure.

As shown in FIG. 2, NAND flash memory system 150 may be formed from thirty-two (32) individually addressable NAND flash memory storage devices. In the illustrated example, each of the flash memory storage devices M0a-M15b takes the form of a board-mounted flash memory module capable of storing one or more bits per cell. Thus, flash memory modules may be implemented with Single Level Cell (SLC), Multi-Level Cell (MLC), Three Level Cell (TLC), or Quad Level Cell (QLC) memory. The thirty-two NAND flash memory modules are arranged in sixteen groups of two, (M0a, M0b) through (M15a, M15b). For purposes of the physical addressing scheme, each group of two modules forms a "lane," also sometimes referred to as a "channel," such that NAND flash memory system 150 includes sixteen channels or lanes (Lane0-Lane15).

In a preferred embodiment, each of the individual lanes has a respective associated bus coupling it to the associated flash controller 140. Thus, by directing its communications to one of the specific communication buses, flash controller 140 can direct its communications to one of the lanes of memory modules. Because each communication bus for a given lane is independent of the communication buses for the other lanes, a flash controller 140 can issue commands and send or receive data across the various communication buses at the same time, enabling the flash controller 140 to access the flash memory modules corresponding to the individual lanes at, or very nearly at, the same time.

Figure 3:
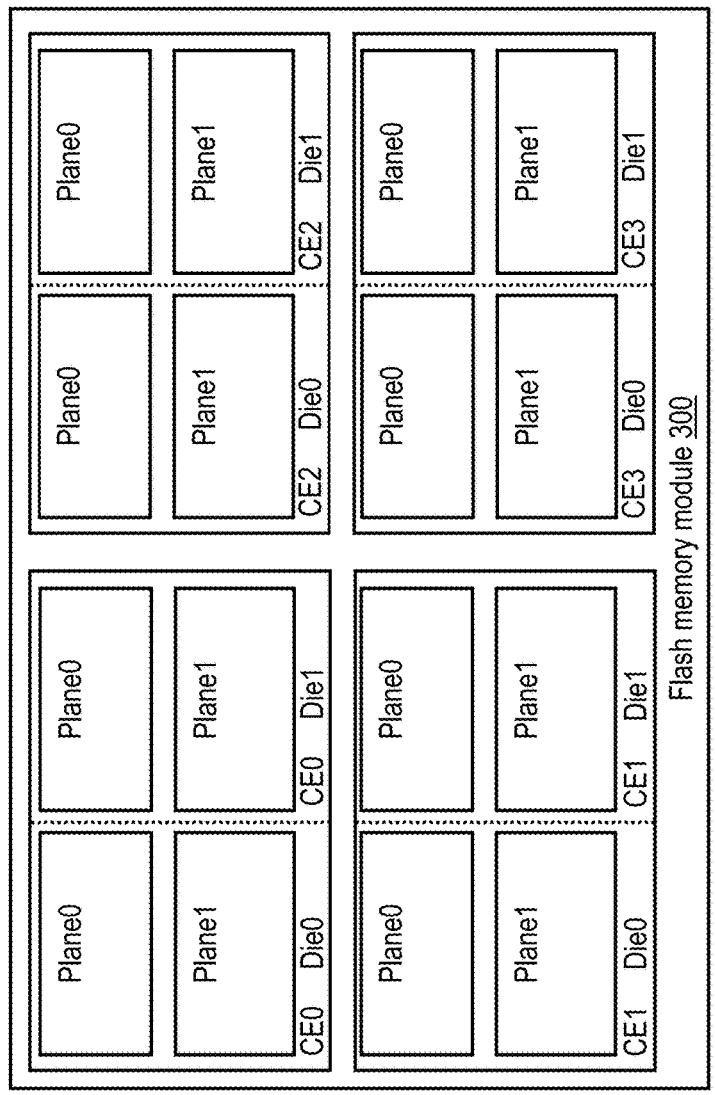

With reference now to FIG. 3, there is illustrated an exemplary embodiment of a flash memory module 300 that can be utilized to implement any of flash memory modules M0a-M15b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash memory chips, are physically associated with one another and that utilize common circuitry (e.g., I/O buffers) for the performance of various operations, such as read and write operations.

Figure 4:
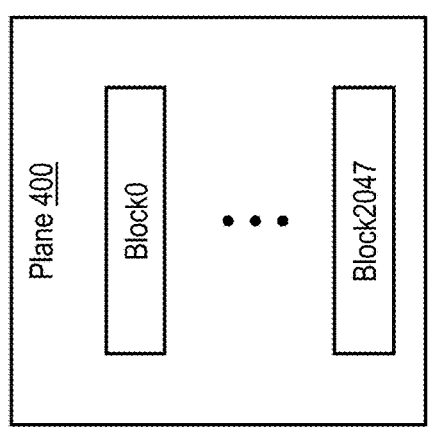
Figure 5:
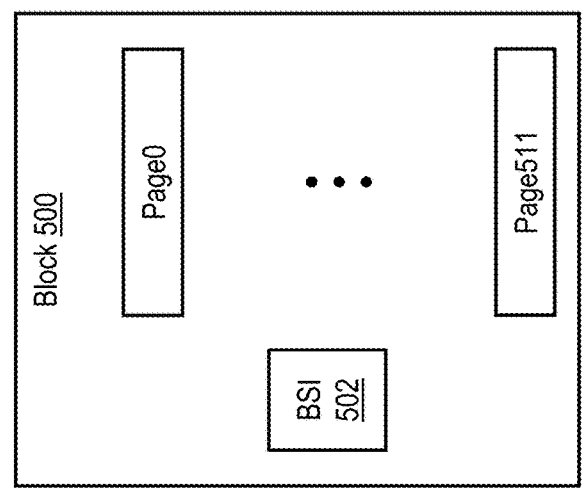

As further shown in FIGS. 4-5, an exemplary plane 400, which can be utilized to implement any of the planes within flash memory module 300 of FIG. 3, includes, for example, 1024 or 2048 blocks of physical memory. Note that manufacturers often add some additional blocks as some blocks might fail early. In general, a block 500 is a collection of physical pages that are associated with one another, typically in a physical manner. This association is such that a block is defined to be the smallest granularity of physical storage locations that can be erased within NAND flash memory system 150. In the embodiment of FIG. 5, each block 500 includes, for example, 256 or 512 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory system 150 on a page-by-page basis, but erased on a block-by-block basis.

If NAND flash memory system 150 is implemented in a memory technology supporting multiple bits per cell, it is common for multiple physical pages of each block 500 to be implemented in the same set of memory cells. For example, assuming 512 physical pages per block 500 as shown in FIG. 5 and two bits per memory cell (i.e., NAND flash memory 150 is implemented in MLC memory), Page0 through Page255 (the lower pages) can be implemented utilizing the first bit of a given set of memory cells and Page256 through Page511 (the upper pages) can be implemented utilizing the second bit of the given set of memory cells. The actual order of lower and upper pages may be interleaved and depends on the manufacturer.

As further shown in FIG. 5, each block 500 preferably includes block status information (BSI) 502, which indicates the page retirement status of physical pages comprising that block 500 as retired (i.e., no longer used to store user data) or non-retired (i.e., active or still usable to store user data). In various implementations, BSI 502 can be collected into a single data structure (e.g., a vector or table) within block 500 and/or maintained elsewhere in data storage system 120. As one example, in the embodiment illustrated in FIG. 9, the block status information of all blocks 500 in a NAND flash memory system 150 is collected in a system-level data structure, for example, a block status table (BST) 946 stored in GPP memory 134 or a flash controller memory 142.

Because the flash translation layer implemented by data storage system 120 isolates the logical address space made available to host devices from the physical memory within NAND flash memory system 150, the size of NAND flash memory system 150 need not be equal to the size of the logical address space presented to host devices. In most embodiments it is beneficial to present a logical address space that is less than the total available physical memory (i.e., to over-provision NAND flash memory system 150). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cycle Redundancy Check (CRC), and parity. As noted above, in some embodiments, the overprovisioned capacity is relatively small, for example, to reduce the overall cost of data storage system 120. It is desirable even in such embodiments to employ health management to extend the operating lifetime of the flash storage media of NAND flash memory systems 150, as discussed further below with reference to FIG. 11.

Figure 6A:
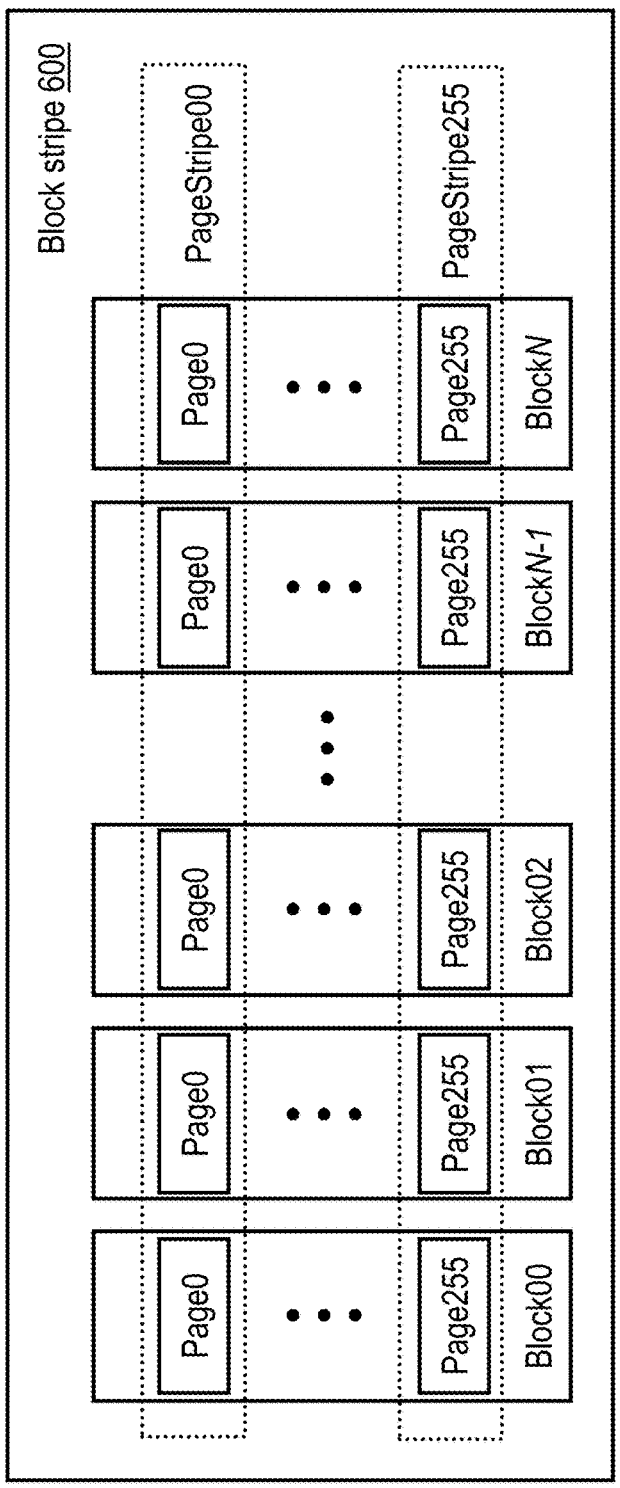
FIG. 6A depicts an exemplary implementation of a block stripe in accordance with the present disclosure.

In some embodiments, data is written to NAND flash memory system 150 one page at a time. In other embodiments in which more robust error recovery is desired, data is written to groups of associated physical pages of NAND flash memory system 150 referred to herein as "page stripes." In a preferred embodiment, all pages of a page stripe are associated with different lanes to achieve high write bandwidth. Because in many implementations the smallest erase unit is a block, page stripes can be grouped into a block stripe as is shown in FIG. 6A, where each block in the block stripe is associated with a different lane. When a block stripe is built, any free block of a lane can be chosen, but preferably all blocks within the same block stripe have the same or similar health grade. Note that the block selection can be further restricted to be from the same plane, die, and/or chip enable. The lengths of the block stripes can and preferably do vary, but in one embodiment in which NAND flash memory system 150 includes 16 lanes, each block stripe includes between two and sixteen blocks, with each block coming from a different lane. Further details regarding the construction of block stripes of varying lengths can be found in U.S. Pat. Nos. 8,176,284; 8,176,360; 8,443,136; and 8,631,273, which are incorporated herein by reference in their entireties.

Figure 6B:
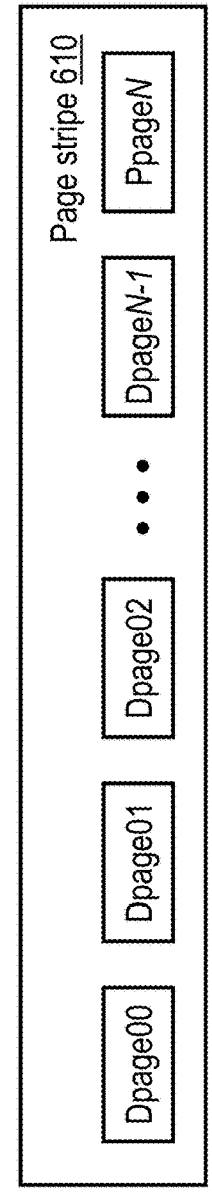
FIG. 6B depicts an exemplary implementation of a page stripe in accordance with the present disclosure.

Once a block from each lane has been selected and a block stripe is formed, page stripes are preferably formed from physical pages with the same page number (i.e., physical page index) from blocks in the block stripe. While the lengths of the various page stripes stored into NAND flash memory system 150 can and preferably do vary, in one embodiment each page stripe includes one to fifteen data pages of write data (typically provided by a host device) and one additional page (a "data protection page") used to store data protection information for the write data. For example, FIG. 6B illustrates an exemplary page stripe 610 including N data pages (i.e., Dpage00 through DpageN-1) and one data protection page (i.e., PpageN). The data protection page can be placed on any lane of the page stripe containing a non-retired page, but typically is on the same lane for all page stripes of the same block stripe to minimize metadata information. The addition of a data protection page as illustrated requires that garbage collection be performed for all page stripes of the same block stripe at the same time. After garbage collection of the block stripe completes, the block stripe can be dissolved, and each block can be placed into the relevant ready-to-use (RTU) queue as explained below.

Figures 7, 8:
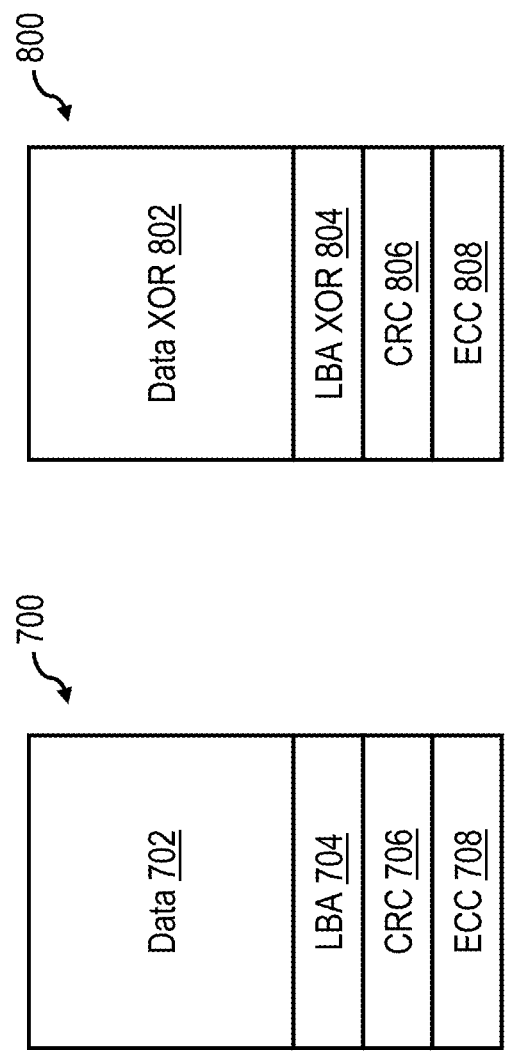
FIG. 7 illustrates an exemplary codeword stored in each data page in accordance with the present disclosure.
FIG. 8 depicts an exemplary codeword stored in each data protection page in accordance with the present disclosure.

FIG. 7 illustrates an exemplary format of a codeword stored in each data page within page stripe 610 of FIG. 6B. Typically, a positive integer number of codewords, for example, 2 or 3, are stored in each data page, but an alternative embodiment may also store a single codeword in a data page. In this example, each codeword 700 includes a data field 702, as well as additional fields for metadata describing the data page. Depending on the size of the codeword, the data field 702 holds data for one or more logical pages. In another embodiment it may also hold fractions of data of logical data pages. In the illustrated example, metadata fields include an LBA field 704 containing the LBAs stored in codeword 700, a CRC field 706 containing the CRC value computed for the combination of data field 702 and LBA field 704, and an ECC field 708 containing an ECC value calculated, in the illustrated example, from a combination of contents of data field 702, LBA field 704 and CRC field 706. In case data field 702 holds fractions of logical data pages, the LBA field 704 further holds information on which fractions of logical data pages are stored in the data field 702.

FIG. 8 depicts an exemplary format of a codeword in the data protection page of page stripe 610 of FIG. 6. In one embodiment, each data protection page stores a positive integer number of codewords, but an alternative embodiment a data protection page may store a single codeword. In the depicted example, data protection codeword 800 includes a data XOR field 802 that contains the bit-by-bit Exclusive OR (XOR) of the contents of the data fields 702 of the codewords 700 in page stripe 610. Data protection codeword 800 further includes an LBA XOR field 804 that contains the bit-by-bit XOR of the LBA fields 704 of the codewords 700 in page stripe 610. Data protection codeword 800 finally includes a CRC field 806 and ECC field 808 for respectively storing a CRC value and an ECC value for data protection codeword 800. Such a protection scheme is commonly referred to as RAID 5, since the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different data protection mechanisms. First, the use of the ECC bits in each codeword of a data page allows the correction of some number of bit errors within the codeword in a flash page. Depending on the ECC method used it may be possible correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory system 150, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data pages and data protection page. Such embodiments support efficient access to a page stripe because flash controller 140 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Having described the general physical structure and operation of one exemplary embodiment of a data storage system 120, certain operational aspects of data storage system 120 are now described with reference to FIG. 9, which is a high level flow diagram of the flash management functions and data structures employed by GPP 132 and/or flash controllers 140 in accordance with at least one embodiment.

As noted above, data storage system 120 does not generally allow external devices to directly address and/or access the physical memory locations within NAND flash memory systems 150. Instead, data storage system 120 is generally configured to present a single contiguous logical address space to the external devices, thus allowing host devices to read and write data to and from LBAs within the logical address space while permitting flash controllers 140 and GPP 132 to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 manages the logical-to-physical translation using a logical-to-physical translation data structure, such as logical-to-physical translation (LPT) table 900, which can be stored in the associated flash controller memory 142.

Flash management code running on the GPP 132 tracks erased blocks of NAND flash memory system 150 that are ready to be used in ready-to-use (RTU) queues 906, which may be stored, for example, in GPP memory 134. As discussed further below with reference to FIG. 10, management code running on the GPP 132 preferably maintains multiple RTU queues 906 per channel or even per plane, and an identifier of each erased block that is to be reused is enqueued in one of the RTU queues 906 corresponding to its channel.

A build block stripes function 920 performed by flash management code running on the GPP 132 constructs new block stripes for storing data and associated parity information from the erased blocks enqueued in RTU queues 906. As noted above with reference to FIG. 6A, block stripes are preferably formed of blocks of the same or similar health (i.e., expected remaining useful life) residing in different channels, meaning that build block stripes function 920 can conveniently construct a block stripe by drawing each block of the new block stripe from corresponding RTU queues 906 of different channels. The new block stripe is then queued to flash controller 140 for data placement.

In response to a write IO received from a host, such as a processor system 102, a data placement function 910 of flash controller 140 determines by reference to LPT table 900 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 910 allocates a page stripe if necessary to store the write data of the write IO and any non-updated data (i.e., in case the write request is smaller than a logical page, there is still valid data which needs to be handled in a read-modify-write manner) from an existing page stripe, if any, targeted by the write IO, and/or stores the write data of the write IO and any non-updated (i.e., still valid) data from an existing page stripe, if any, targeted by the write IO to an already allocated page stripe which has free space left. The page stripe may be allocated from either a block stripe already allocated to hold data or from a new block stripe built by build block stripes function 920. In a preferred embodiment, the page stripe allocation can be based on the health of the blocks available for allocation and the "heat" (i.e., estimated or measured write access frequency) of the LBA of the write data. Data placement function 910 then writes the write data, associated metadata (e.g., CRC and ECC values), for each codeword in each page of the page stripe, and parity information for the page stripe in the allocated page stripe. The associated metadata and parity information can be written to storage as soon as enough host data has been placed into the page stripe. Flash controller 140 also updates LPT table 900 to associate the physical page(s) utilized to store the write data with the LBA(s) indicated by the host device. Thereafter, flash controller 140 can access the data to service host read IOs by reference to LPT table 900 as further illustrated in FIG. 9.

Once all pages in a block stripe have been written, flash controller 140 places the block stripe into one of occupied block queues 902, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 912. Garbage collector 912 selects particular block stripes for garbage collection based on a number of factors including, for example, how much of the data within the erase blocks is invalid and the health of the blocks within the block stripes. In the illustrated example, garbage collection is performed on entire block stripes, and flash management code running on GPP 132 logs the block stripes ready to be recycled in a relocation queue 904, which can conveniently be implemented in the associated flash controller memory 142 or GPP memory 134.

The flash management functions performed by GPP 132 or flash controller 140 additionally include a relocation function 914 that relocates the still valid data held in block stripes enqueued in relocation queue 904. To relocate such data, relocation function 914 issues relocation write requests to data placement function 910 to request that the data of the old block stripe be written to a new block stripe in NAND flash memory system 150. In addition, relocation function 914 updates LPT table 900 to remove the current association between the logical and physical addresses of the data and replace it with the new association. Once all still valid data has been moved from the old block stripe, the old block stripe is passed to dissolve block stripes function 916, which decomposes the old block stripe into its constituent blocks, thus disassociating the blocks. Flash controller 140 then erases each of the blocks formerly forming the dissolved block stripe and increments an associated program/erase (P/E) cycle count for the block in P/E cycle counts 944.

Based on the health metrics of each erased block, each erased block is either retired (i.e., no longer used to store user data) by a block retirement function 918 among the flash management functions executed on GPP 132, or alternatively, prepared for reuse by placing the block's identifier on the appropriate ready-to-use (RTU) queue 906 in the associated GPP memory 134.

Figure 9:
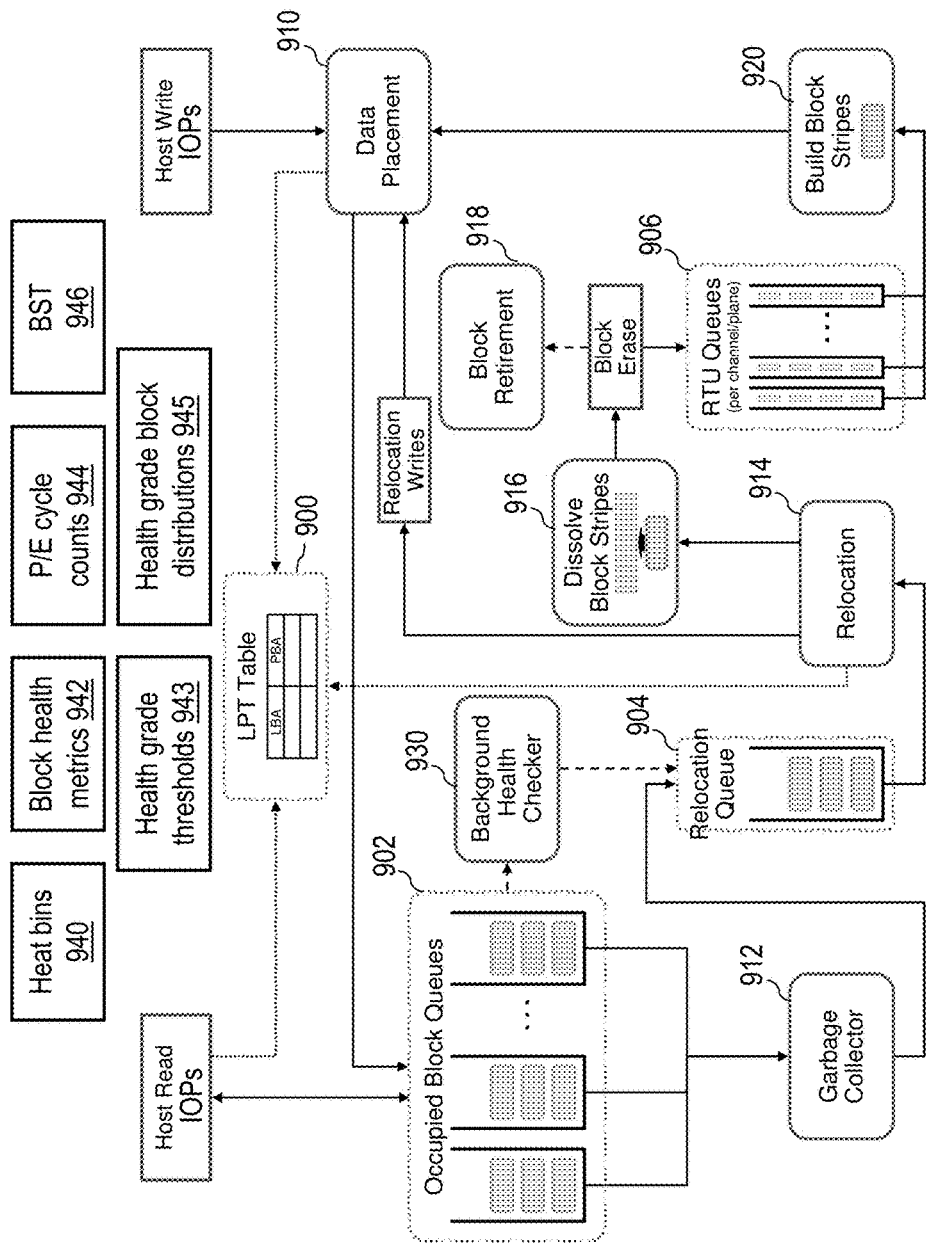
FIG. 9 is a high level flow diagram of the flash management functions and data structures employed to manage a flash memory in accordance with one embodiment.

As further shown in FIG. 9, flash management functions executed on GPP 132 include a background health checker 930. Background health checker 930, which operates independently of the demand read and write IOs of hosts such as processor systems 102, continuously determines and records one or more block health metrics 942 (e.g., worst page and/or mean page bit error rate (BER), programming and read voltages, etc.) for blocks belonging to block stripes recorded in occupied block queues 902. Based on the one or more of the block health metrics 942, background health checker 930 may place block stripes on relocation queue 904 for handling by relocation function 914.

Figure 10:
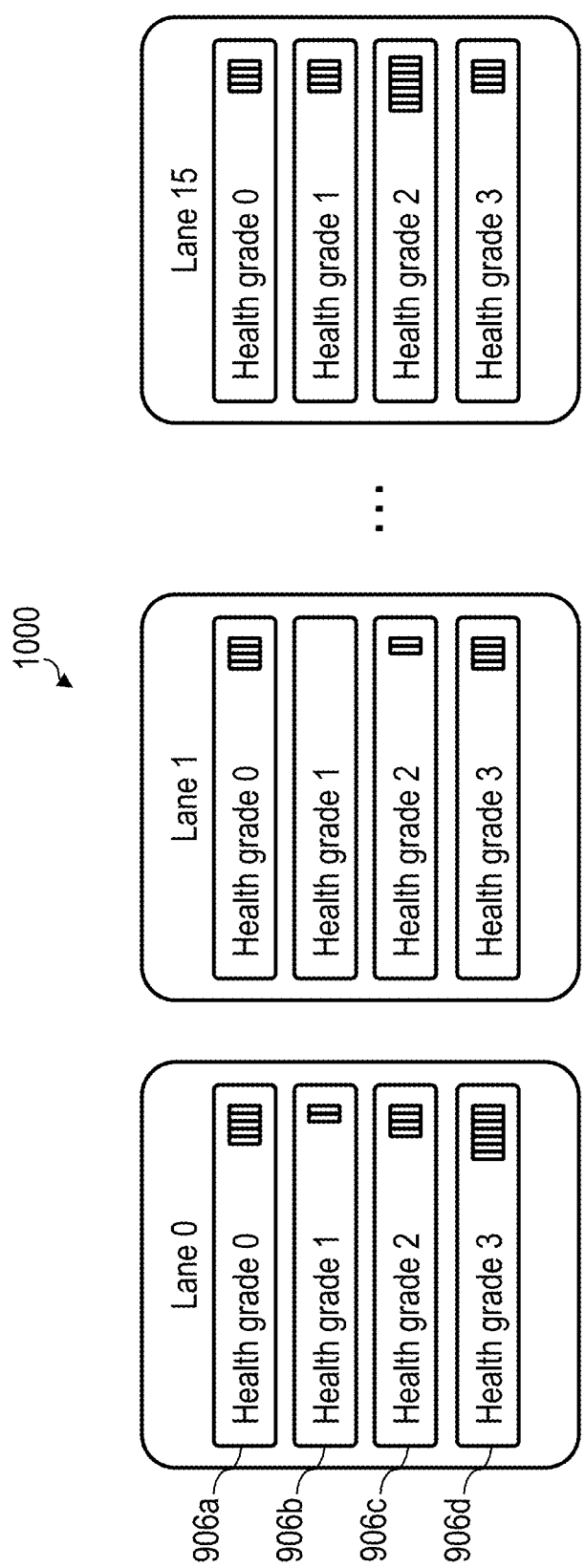
FIG. 10 depicts a more detailed view of the per-plane ready-to-use (RTU) queues of FIG. 9 in accordance with one embodiment.

Referring now to FIG. 10, there is depicted a more detailed view of a set of ready-to-use (RTU) queues 1000 in accordance with one embodiment. In the illustrated embodiment, the set of RTU queues 1000 include, for each lane, a respective RTU queue 906 for each of a plurality of block health grades configured in accordance with FIG. 11, which is described below. An identifier of a block that is erased and ready-to-use is enqueued in only one of the RTU queues 906 for its lane. In some embodiments, one particular plane from each lane may be used to build a set of RTU queues 1000.

In the depicted embodiment, GPP 132 has configured four block health grades by applying different health grade thresholds 943 to block health metrics 942, where grade 0 is assigned to the healthiest blocks (e.g., those having the lowest worst page BER), grades 1 and 2 are assigned to blocks of intermediate health (with those in grade 1 being healthier than those in grade 2), and grade 3 is assigned to the least healthy blocks (e.g., those having the highest worst page BER). The health grade thresholds 943 are determined based on the currently desired health grade block distributions 945 which define how many non-retired blocks should be assigned to each health grade in absolute or relative numbers. Preferably, separate health grade block distributions 945 are maintained for each channel and/or each plane, but a global health grade block distribution 945 may be used as well. GPP 132 accordingly implements four RTU queues 906a-906d per lane respectively corresponding to these four health grades.

As further indicated in FIG. 10, RTU queues 906a-906d within a given lane and across the different lanes often have different distributions of ready-to-use blocks. Because the variations in the distributions of the health of blocks between RTU queues 906a-906d, it can be the case that not enough blocks of a preferred health grade are available to build a block stripe composed of blocks of the same health grade. For example, in FIG. 10, RTU queue 906b of Lane 1 does not include any blocks of grade 1, meaning that in this scenario build block stripes function 920 would be unable to build a full length block stripe composed of blocks of health grade 1. Consequently, in this scenario, build block stripes function 920 would need to form a full length block stripe using either a more healthy block (e.g., from RTU queue 906a of Lane 1) or a less healthy block (e.g., from RTU queue 906c of Lane 1) than would be optimal to achieve a narrow block wear distribution.

In accordance with one embodiment, the distribution of blocks among the various health grades and thus the RTU queues 906 is improved by automatically and dynamically adjusting the health grade block distributions 945 and/or health grade thresholds 943 utilized to classify the health of blocks, as described below with reference to FIG. 11. By dynamically adjusting the health grade thresholds 943, the probability of availability of at least one block of each health grade in the corresponding RTU queues 906 is increased.

With reference now to FIG. 11, there is depicted a high level logical flowchart of an exemplary process for adapting block health grades in accordance with one embodiment. The method may be performed, for example, by GPP 132 or flash controller 140 in hardware or by hardware executing firmware and/or software (e.g., flash management code). When performing the illustrated process or another of the processes described herein, GPP 132 and/or flash controller 140, whether performing steps individually or in concert, can thus be referred to generally as a "controller." For simplicity of explanation, it will hereafter be assumed that the process of FIG. 11 is performed by GPP 132. As a logical flowchart, operations are presented in logical rather than strictly chronological order, and in some embodiments, operations can be performed in a different order than presented or concurrently.

The process of FIG. 11 begins at block 1100 and then proceeds to block 1102, which illustrates GPP 132 configuring a desired number of health grades for blocks of physical memory in a NAND flash memory array 150. In at least one embodiment, the "health" of a block is defined as the estimated useful remaining lifetime of a physical block of memory. As individual physical blocks experience wear, their health will generally decline over time. As the health grade thresholds 943 are adapted over time, the relative health among blocks determines to which health grade a block is assigned. Particularly, based on the intrinsic properties of the blocks, an initially healthy block may transition over time from the most healthy health grade (corresponding to the longest expected remaining lifetime) to the least healthy health grade (corresponding to the shortest expected remaining lifetime) while other block initially less healthy may become healthier with respect to other blocks in the system over time. Yet other blocks may remain mostly in the same health grade or frequently change their health grade over time. In various embodiments, the number of health grades can vary, but experimentally a number of health grades between one and eight inclusive has been found to be effective. For example, in one embodiment, GPP 132 configures four health grades at block 1102. The health of a block may be determined based on one or more criteria, for example, one or more bit error rate (BER) metrics for each block (and/or the physical pages within each block) of physical memory, and/or the number of program/erase cycles to which each block is subjected, and/or the measured block erase time, and/or the measured page programming time of pages in a block, and/or the measured page read latency of pages in a block. In one particular example, the BER metric used to determine block health may be the worst page BER for each block.

Blocks are assigned to the various health grades based on health grade thresholds 943 and health grade block distributions 945. In some embodiments, health grade block distributions 945 can be expressed in absolute terms, for example, as a number of blocks that must be assigned to each health grade. In other embodiments, health grade block distributions 945 can be defined in relative terms, for example, as a percentage or fraction of physical blocks still in use (i.e., that are not retired) of similar health. For example, if health grade block distributions 945 are defined in relative terms, the initial health grade thresholds 943 established at block 1102 may allocate physical blocks in use to health grades as follows (again assuming an embodiment in which lower health scores correspond to more healthy blocks): 10% of the blocks having the lowest health scores to the most healthy grade (i.e., grade 0), 20% of the blocks having the next lowest health scores to the second most healthy grade (i.e., grade 1), 60% of the blocks having the next lowest health scores to the third most healthy grade (i.e., grade 2), and 10% of the blocks having the highest health scores to the least healthy grade (i.e., grade 3). It should thus be appreciated from this example that an equal distribution of blocks to the health grades can be, but need not be employed. Note that health grade thresholds 943 can be expressed as numerical health values demarking different health grades, such that a block is assigned (assuming an embodiment in which lower health scores correspond to more healthy blocks) to the lowest numbered health grade for which the block's health score satisfies (e.g., is less than or equal to) the health grade threshold. In other embodiments, the health grade thresholds 943 can also be defined in relative terms similarly to the health grade block distributions 945 described above.

At block 1104, GPP 132 additionally configures a desired number of heat bins 940 for LBAs served by NAND flash memory system 150. In various embodiments, the number of heat bins 940 can vary, but experimentally a number of heat bins between two and eight inclusive has been found to be effective. For example, in one embodiment, GPP 132 configures four heat bins 940 at block 1104, including a first heat bin for the most frequently written LBAs, a second heat bin for less frequently written LBAs, a third heat bin for still less frequently written LBAs, and a fourth heat bin for the least frequently written LBAs. The number of heat bins 940 configured at block 1104 may, but need not, equal the number of health grades configured at block 1102.

At block 1106, GPP 132 establishes a mapping between the heat bins 940 configured at block 1104 and the health grades configured at block 1102. In one particularly preferred embodiment, heat and health are directly correlated, with the hottest LBAs mapped to the healthiest health grades and the colder LBAs mapped to the less healthy health grade. Of course, in other embodiments, other mappings between access heat and health grades may be employed. Such alternative mappings can include those used by the build block stripes function 920 when creating a block stripe in case no free block is available for the preferred health grade. In yet another embodiment the mapping might even vary over time, for example, as a function of the observed workload characteristics.

Following block 1106, the process of FIG. 11 proceeds to block 1108, which illustrates GPP 132 monitoring the fill levels of RTU queues 906. The degree of monitoring performed at block 1108 can vary between embodiments. For example, in some embodiments, GPP 132 determines a count of the number of blocks enqueued and dequeued within each RTU queue 906 at block 1108. In other embodiments, at block 1108, GPP 132 simply determines if any of RTU queues 906 is empty.

At block 1110, GPP 132 determines whether or not to adjust one or more health grade block distributions 945 that define the number of blocks belonging to each health grade associated with the health grade block distribution 945. In a typical implementation, GPP 132 adjusts one or more values of one or more health grade block distributions 945 in response to occurrence of one or a combination of predetermined events. For example, GPP 132 may determine at block 1110 to adjust one or more values of one or more health grade block distributions 945 in response to reaching a predetermined count of blocks that have been dequeued from RTU queues 906 for data placement since health grade thresholds 943 were last adjusted, and/or in response to reaching a predetermined minimum and/or maximum count of blocks in one or more of the RTU queues 906, and/or in response to background health checker 930 completing an iteration of updating block wear information for all blocks in use, and/or in response to GPP 132 detecting at least a threshold number of empty RTU queues 906, and/or in response to the elapsing of a fixed time interval since health grade thresholds 943 were last adjusted, and/or in response to reaching a threshold count of host write requests since health grade thresholds 943 were last adjusted, and/or in response to GPP 132 and/or flash controller(s) 140 having a threshold number of host write requests to service (e.g., either a low threshold, such as zero, or a high threshold representing many write requests), and/or in response to other external or internal events. Alternatively, GPP 132 may determine at block 1110 to adjust one or more health grade block distributions 945 at pseudo-random time intervals.

In response to determining not to adjust one or more health grade block distributions 945 at block 1110, the process returns to block 1108. However, in response to a determination to adjust one or more health grade block distributions 945 at block 1110, GPP 132 adjusts one or more health grade block distributions 945 at block 1112. In one preferred embodiment, GPP 132 adjusts the one or more health grade block distributions 945 at block 1112, thus adjusting the number of blocks assigned to each health grade. Next, at block 1114, GPP 132 adjusts the health grade thresholds 943 according to the adjusted health grade distributions 945 in order to promote a more equal distribution of blocks among the RTU queues 906 within at least one lane. It is preferred if the amount of adjustment and the number of health grade thresholds 943 are selected to ensure presence of at least one and up to a predefined number of blocks in each of RTU queues 906. In various embodiments, the increments and/or decrements utilized to adapt the health grade block distributions 945 and heath grade thresholds 943 can be fixed values or can vary, for example, depending on the current number of blocks in the RTU queue(s) 906 of one or more health grades and may each be further bounded by respective upper and lower health grade threshold values. In some preferred embodiments, the adjustments made at blocks 1112 and 1114 can be bounded by limitations regarding some RTU queues 906. For example, in one embodiment, the adjustments made at blocks 1112 and 1114 are bounded by both a minimum and a maximum number of blocks that can be placed on the RTU queues 906 associated with one or more health grades for healthier blocks (e.g., at least RTU queues 906a). In another embodiment, the adjustments made at blocks 1112 and 1114 are bounded by both a minimum and a maximum number of blocks that can be placed on the RTU queues 906 associated with one or more health grades for the unhealthiest but not yet retired blocks (e.g., at least RTU queues 906d). In particular, such bounds are enforced when some RTU queues 906 hold too many or too few blocks, these blocks will on average be subject to too few or too many P/E cycles. For some RTU queues 906, for example those in RTU queues 906c, the adjustments made at blocks 1112 and 1114 may be bounded by only a minimum number of blocks that can be placed on those RTU queues 906.

As one specific example of the adjustment of health grade block distributions, consider the case in which the health grade block distributions 945 associated with the four previously described health grades are 10%, 20%, 60% and 10%, respectively, such that the healthiest 10% of blocks are assigned grade 0, the next less healthy 20% of blocks are assigned to grade 1, the next lest healthy 60% of blocks are assigned to grade 2, and the least healthy 10% of blocks are assigned to grade 3. If there are no blocks of the healthiest grade (grade 0) in the RTU queue 906a of one or more lanes, data to be written to one of the hottest LBAs will have to be written to less healthy blocks drawn from one or more other RTU queues 906. However, if the health grade block distributions 945 associated with grades 0 and 1 are adjusted from 10% to 15% and from 20% to 15%, respectively, at block 1112 and the health grade thresholds 943 are adjusted to reflect the changes in the health grade block distributions 945 accordingly, then one or more additional blocks originally assigned to grade 1 may be assigned to grade 0, thus allowing the data written to the hottest LBAs to be assigned to the healthiest blocks.

In some embodiments, at least the blocks within RTU queues 906 (and preferably all active blocks that have not been retired) are re-graded in accordance with the adjustment of one or more of the health grade block distributions 945 and one or more health grade thresholds 943 defining the health grades. In at least some embodiments, blocks within RTU queues 906 that change grades can be reassigned to different RTU queue(s) 906 in accordance with the new health grade thresholds 943. These embodiments are represented in FIG. 11 by the process proceeding directly from block 1114 to block 1118. In alternative embodiments, the re-grading of blocks (and reassignment of blocks to different RTU queues 906) can be delayed following block 1114 until one or more conditions are met, as represented by decision block 1116. These condition(s) may include, for example, the controller reaching a selected state, the elapsing of a predetermined interval from the adjustment of the health grade block distribution(s) 945 and health grade threshold(s) 943 at block 1112 and 1114, the elapsing of predetermined interval from the immediately previous re-grading, etc. During the delay in re-grading the blocks, blocks may be consumed from RTU queues 906 under the health grading defined by the prior health grade thresholds 943. It is important to note that the re-grading performed at block 1118 can change the order in which ready-to-use blocks are consumed by data placement function 910. For instance, in the example given above, the block(s) moved to a RTU queue 906a from the associated RTU queue 906b may have been enqueued at the end of the RTU queue 906b. As a result, those block(s) can be consumed immediately from RTU queue 906a, thus improving health binning. Following block 1118, the process of FIG. 11 returns to block 1108, which has been described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, in at least one embodiment, a data storage system includes a controller that controls a non-volatile memory array including a plurality of blocks. The controller assigns the plurality of blocks to a plurality of different health grades. The controller maintains a plurality of ready-to-use queues identifying blocks that do not currently hold valid data and are ready for use for data storage. Each of the plurality of ready-to-use queues is associated with a respective one of the plurality of health grades. The controller monitors fill levels in the plurality of ready-to-use queues, and based on the monitoring, adjusts at least one health grade block distribution for the plurality of blocks. Based on the adjustment of the at least one health grade block distribution, the controller thereafter re-grades blocks among the plurality of blocks and assigns blocks among the plurality of blocks to the plurality of ready-to-use queues in accordance with the at least one health grade block distribution that was adjusted, such that distribution of blocks within the plurality of ready-to-use queues is improved.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude energy per se, transmission media per se, and transitory propagating signals per se.

In addition, although embodiments have been described that include use of a NAND flash memory, it should be appreciated that embodiments of the present invention can also be used with other types of non-volatile random access memory (NVRAM) including, for example, phase-change memory (PCM) or magnetoresistive random access memory (MRAM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method in a data storage system including a non-volatile memory array controlled by a controller, wherein the non-volatile memory array includes a plurality of blocks of physical memory, the method comprising:
the controller assigning the plurality of blocks in the memory array to a plurality of different health grades by applying a set of health grade thresholds to block health metrics of the plurality of blocks;
the controller maintaining a plurality of ready-to-use queues identifying blocks that do not currently hold valid data and are ready for use for data storage, where each of the plurality of ready-to-use queues is associated with a respective one of the plurality of health grades;
the controller monitoring fill levels in the plurality of ready-to-use queues;
based on the monitoring, the controller adjusting at least one health grade threshold in the set of health grade thresholds for the plurality of blocks; and
based on the adjustment of the at least one health grade threshold, thereafter re-grading blocks among the plurality of blocks in the ready-to-use queues with respect to the plurality of health grades and assigning blocks among the plurality of blocks to the plurality of ready-to-use queues in accordance with the at least one health grade threshold that was adjusted, such that distribution of blocks within the plurality of ready-to-use queues is improved.

2. The method of claim 1, wherein:
the method further includes adjusting the at least one health grade threshold based on adjustment of a set of health grade block distributions that defines how many non-retired blocks should be assigned to each health grade.

3. The method of claim 2, wherein the set of health grade block distributions specifies relatively defined subsets of the plurality of blocks.

4. The method of claim 1, wherein the at least one health grade threshold specifies an absolute health metric value.

5. The method of claim 1, wherein the adjusting includes adjusting the at least one health grade threshold such that at least one of the plurality of blocks is assigned to each of the plurality of ready-to-use queues.

6. The method of claim 1, wherein the adjusting includes performing the adjusting in response to at least one event from a set including:
dequeuing of a predetermined count of blocks from the plurality of ready-to-use queues since the at least one health grade threshold was last adjusted;
falling below a predetermined minimum count of blocks in one or more of the ready-to-use queues;
exceeding a predetermined maximum count of blocks in one or more of the ready-to-use queues;
completing an iteration of health checking for the plurality of physical blocks;
detecting at least a threshold number of empty ready-to-use queues;
receiving a threshold count of host write requests since the at least one health grade threshold was last adjusted; and
having a predetermined number of host write requests to service.

7. The method of claim 1, and further comprising:
following the adjusting, delaying the re-grading and assigning of blocks to the plurality of ready-to-use queues based on the at least one health grade threshold that was adjusted until at least one re-grading condition is satisfied.

8. A data storage system, comprising:
an integrated circuit implementing a controller configured to be coupled to a non-volatile memory array including a plurality of blocks of physical memory, wherein the controller is configured to:
assign the plurality of blocks in the memory array to a plurality of different health grades by applying a set of health grade thresholds to block health metrics of the plurality of blocks;
maintain a plurality of ready-to-use queues identifying blocks that do not currently hold valid data and are ready for use for data storage, where each of the plurality of ready-to-use queues is associated with a respective one of the plurality of health grades;
monitor fill levels in the plurality of ready-to-use queues;
adjust at least one health grade threshold in the set of health grade thresholds for the plurality of blocks based on the fill levels; and based on the adjustment of the at least one health grade threshold, thereafter re-grade blocks among the plurality of blocks in the ready-to-use queues with respect to the plurality of health grades and assign blocks among the plurality of blocks to the plurality of ready-to-use queues in accordance with the at least one health grade block threshold that was adjusted, such that distribution of blocks within the plurality of ready-to-use queues is improved.

9. The data storage system of claim 8, wherein:
the controller is further configured to adjust the at least one health grade threshold based on adjustment of a set of health grade block distributions that defines how many non-retired blocks should be assigned to each health grade.

10. The data storage system of claim 9, wherein the set of health grade block distributions specifies relatively defined subsets of the plurality of blocks.

11. The data storage system of claim 8, wherein the at least one health grade threshold specifies an absolute health metric value.

12. The data storage system of claim 8, wherein the controller adjusts the at least one health grade threshold such that at least one of the plurality of blocks is assigned to each of the plurality of ready-to-use queues.

13. The data storage system of claim 8, wherein the controller is configured to adjust the at least one health grade responsive to at least one event from a set including:
dequeuing of a predetermined count of blocks from the plurality of ready-to-use queues since the at least one health grade threshold was last adjusted;
falling below a predetermined minimum count of blocks in one or more of the ready-to-use queues;
exceeding a predetermined maximum count of blocks in one or more of the ready-to-use queues;
completing an iteration of health checking for the plurality of physical blocks;
detecting at least a threshold number of empty ready-to-use queues;
receiving a threshold count of host write requests since the at least one health grade threshold was last adjusted; and
having a predetermined number of host write requests to service.

14. The data storage system of claim 8, wherein the controller is configured to, following adjustment of the at least one health grade threshold, delay re-grading and assignment of the blocks to the plurality of ready-to-use queues based on the at least one health grade threshold that was adjusted until at least one re-grading condition is satisfied.

15. The data storage system of claim 8, and further comprising the non-volatile memory array coupled to the controller.

16. A computer program product, the computer program product comprising a computer readable storage device having program instructions embodied therewith, the program instructions executable by a controller for a non-volatile memory array including a plurality of blocks of physical memory, to cause the controller to perform:
assigning the plurality of blocks in the memory array to a plurality of different health grades by applying a set of health grade thresholds to block health metrics of the plurality of blocks;
maintaining a plurality of ready-to-use queues identifying blocks that do not currently hold valid data and are ready for use for data storage, where each of the plurality of ready-to-use queues is associated with a respective one of the plurality of health grades;
monitoring fill levels in the plurality of ready-to-use queues;
based on the monitoring, the controller adjusting at least one health grade threshold in the set of health grade thresholds for the plurality of blocks; and
based on the adjustment of the at least one health grade threshold, thereafter re-grading blocks among the plurality of blocks in the ready-to-use queues with respect to the plurality of health grades and assigning blocks among the plurality of blocks to the plurality of ready-to-use queues in accordance with the at least one health grade threshold that was adjusted, such that distribution of blocks within the plurality of ready-to-use queues is improved.

17. The computer program product of claim 16, wherein:
the program instructions further cause the controller to perform adjusting the at least one health grade threshold based on adjustment of a set of health grade block distributions that defines how many non-retired blocks should be assigned to each health grade.

18. The computer program product of claim 17, wherein the set of health grade block distributions specifies relatively defined subsets of the plurality of blocks.

19. The computer program product of claim 16, wherein the adjusting includes adjusting the at least one health grade block threshold such that at least one of the plurality of blocks is assigned to each of the plurality of ready-to-use queues.

20. The computer program product of claim 16, wherein the adjusting includes performing the adjusting in response to at least one event from a set including:
dequeuing of a predetermined count of blocks from the plurality of ready-to-use queues since the at least one health grade threshold was last adjusted;
falling below a predetermined minimum count of blocks in one or more of the ready-to-use queues;
exceeding a predetermined maximum count of blocks in one or more of the ready-to-use queues;
completing an iteration of health checking for the plurality of physical blocks;
detecting at least a threshold number of empty ready-to-use queues;
receiving a threshold count of host write requests since the at least one health grade threshold was last adjusted; and
having a predetermined number of host write requests to service.

21. The computer program product of claim 16, wherein the program instructions further cause the controller to perform:
following the adjusting, delaying the re-grading and assigning of blocks to the plurality of ready-to-use queues based on the at least one health grade block threshold that was adjusted until at least one re-grading condition is satisfied.

\* \* \* \* \*